Feb. 13, 1951 A. CHURCHILL 2,541,461
ELECTRONIC COMBINATION SWITCH
Filed April 1, 1949
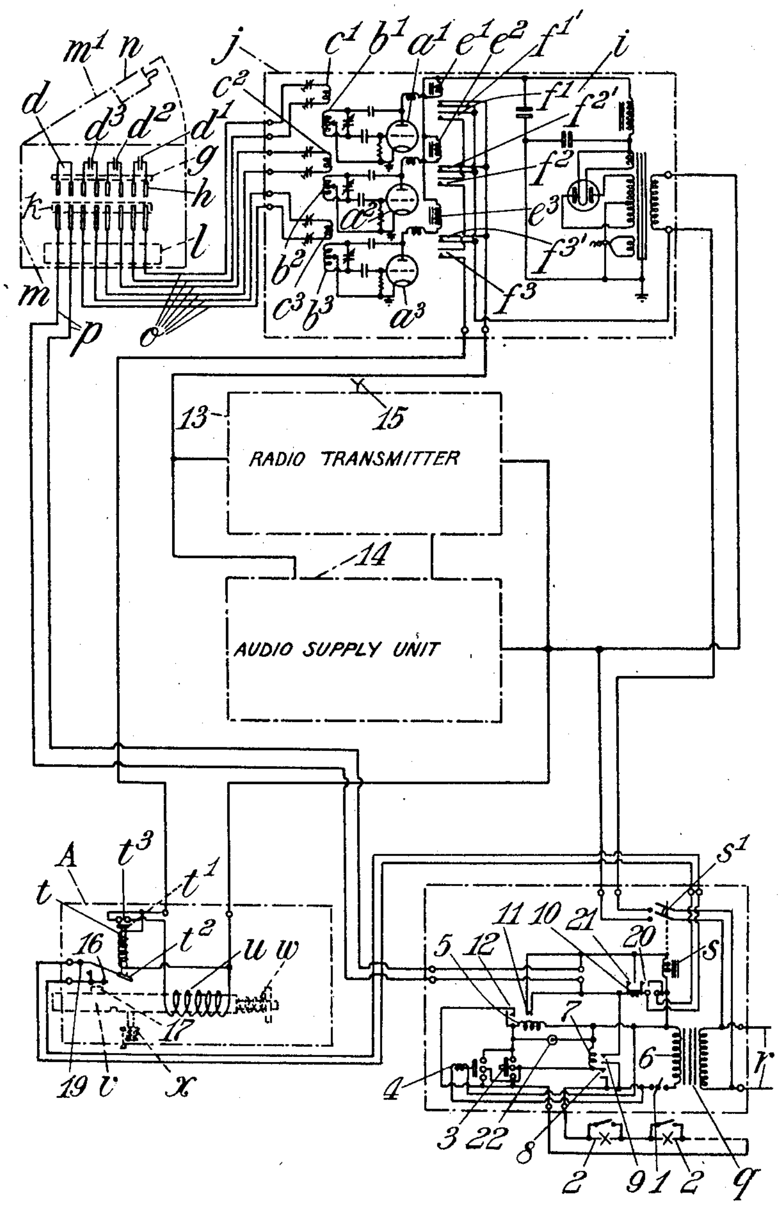
Inventor
A. Churchill
By [signature]
Atty Patented Feb. 13, 1951 2,541,461

UNITED STATES PATENT OFFICE 2,541,461

ELECTRONIC COMBINATION SWITCH

Albert Churchill, Bristol, England

Application April 1, 1949, Serial No. 84,979
In Great Britain April 13, 1948

8 Claims. (Cl. 177—314)

This invention relates to an improved electronic combination switch or lock more particularly intended to prevent unauthorised persons from picking an electric lock, at the same time giving ready and simple access to the authorised persons in possession of the corresponding "keys."

According to the present invention, a master electromagnetic switch or lock inserted in the power supply circuit is connected in series with a number of switches operated by corresponding relays, each one of which is operated by an oscillator coupled to an absorption tuned circuit, which tuned circuits have different natural frequencies from one another, and comprise impedances, preferably capacitors, arranged to be readily connected in and disconnected from the circuit, the means effecting this connection and disconnection including the said impedances constituting a key, hereinafter referred to as a "combination plug," which will enable only authorised persons to have access to the operation of a work circuit.

The invention also consists in the arrangement hereinafter described for carrying the above feature into effect and applying it to a burglar alarm.

One mode of carrying the invention into effect is illustrated diagrammatically and by way of example in the accompanying drawing.

The apparatus may comprise any number of, say three, thermionic valve oscillators $a^1$, $a^2$, $a^3$ of the type in which the plate current increases when the oscillator is quenched, e. g. of the Hartley grid and plate stabilised type, each oscillator being screened and independently operated at a frequency different from that of the other oscillators in the same unit.

Each of the three oscillatory circuits of the oscillators comprises an inductance $b^1$, $b^2$, $b^3$, which is loosely coupled to an inductance $c^1$, $c^2$, $c^3$, of equal value, the latter inductances forming tuned circuits with suitable capacitors $d^1$, $d^2$, $d^3$, hereinafter more particularly referred to; in other words the three oscillatory circuits of the oscillators are loosely coupled to three absorption circuits respectively.

It will be seen that with an incomplete absorption circuit, that is to say with the capacitor removed, the corresponding oscillator will oscillate at the frequency to which its dynamic circuit is tuned, and that the anode current of the valve will be less than it would be in a non-oscillatory state and conversely, with the absorption circuit complete, the oscillatory voltage will drop and the anode current increase. This rise and fall of anode current is brought about by the capacitors being inserted into or disconnected from the absorption circuits.

In the anode circuit of each oscillator there is inserted a sensitive relay $e^1$, $e^2$, $e^3$, operating for instance, single pole single throw switches, $f^1$, $f^2$, $f^3$, respectively, all these switches being connected in series. When all the relays are energised by a rise in anode current all the said switch contacts are closed, the three switches being then connected in series with a spring loaded electromagnetically operated lock A, and power supply for the work circuit.

The three capacitors in the absorption circuits are all housed as a unit $g$ in a compact hermetically sealed casing (about the size of a matchbox) with terminal conductor pins $h$ fitted externally to the casing to facilitate rapid connection and disconnection. This unit is hereinafter refered to as "the combination plug," intended to be inserted in a "combination socket" provided on a "combination panel."

The unit comprising the three oscillators with the inductances $c^1$, $c^2$, $c^3$ of the absorption circuits loosely coupled thereto, and its power pack $i$ are housed together in a screened metal case $j$ which may be fitted at any convenient position inside the secured area.

The combination panel consists of a small sheet of insulating material, on which is fitted a terminal block and combination socket $k$ arranged to register with the conductor pins $h$ of the combination plug. These parts are housed in a metal case $m$ preferably fitted into a recess of the masonry at any convenient position where the combination plug can be brought in engagement therewith on the outside of the secured area. If required a number of sockets $k$ may be provided at any convenient points.

A hinged metal flap $m^1$ is fitted over the combination panel with a rubber gasket to protect it, and a lock $n$ of simple type to secure it.

The electromagnetic lock A may be an electrical relay remotely operated when the combination plug is inserted into the socket provided on the combination panel.

Referring to the interconnections between the master electromagnetic lock A, the power supply and the parts hereinbefore described, they are as follows:

Cables $o$ connect the combination socket $k$ via the terminal block $l$ through conduit tubing to the coupling coils $c^1$, $c^2$, $c^3$.

The power supply to the unit comprising the oscillators and the power pack $i$ is controlled by a shorting link $d$ in the combination plug $g$, which completes across remote control cables $p$ the low tension standing supply via a step-down transformer $q$. The transformer $q$ is fed from the local mains supply $r$ permanently, and its secondary energises a coil $s$, closing the contacts $s^1$ to complete the power supply from its primary to the unit oscillators and power pack, the latter connecting the main supply to the electromagnetic lock A via a coil $t$, the armature $t^1$ of which lifts the insulated contact $t^2$ and makes contact at $t^3$, thereby completing the power supply to the coil $u$ to retract the lock bolt $v$ against a return spring $w$; the bolt $v$ is held by a spring loaded retaining catch $x$, which is capable of being reset mechanically.

The operation of the arrangement hereinbefore described and shown in the drawing, with the supply not yet applied is as follows: In order to unlock, first of all the flap $m^1$ of the combination panel is unlocked and lifted, whereupon the combination plug is inserted into the sockets of the panel, whereby the shorting link $d$ causes the circuit supplying power to the unit of oscillators and power pack $i$ to be closed at $s^1$ by the coil $s$. All the relays $e^1$, $e^2$, $e^3$ are now operated and all the series connected switches $f^1$, $f^2$, $f^3$ are closed as required for the operation of the electromagnetic lock A, thereby effecting the unlocking.

If the system needs to be left unlocked for a long period, this is ensured by the catch $x$ which properly adjusted holds back the bolt $v$ and by the combination plug being withdrawn, thus preserving the life of the valves. To lock-up, the catch $x$ is turned to the position of "release," and the combination plug is withdrawn from the socket in the panel. This causes the circuit of the remote control to be broken and therewith the coil $s$ to be de-energised, the contacts $s^1$ to be opened and the power supply to the oscillators and power pack to be disconnected, thus leaving the system dead. Upon the electrical part of the system being thus locked the flap $m^1$ is locked onto the panel casing $m$ by the lock $n$.

It will be seen that unless the combination plug is in circuit, the set of absorption circuits is not operative, and the oscillators are not quenched; consequently the anode current is not sufficient to energise the relays, and the work circuit remains interrupted whereby its inoperativeness is secured. It will also be seen that as the combination plug is so designed that its three capacitors have each different values, no two installations will have the same combination, thus making it impossible for any unauthorised person or persons to find the correct sequence and valve of capacitors. Further, since the system does not have to be left switched on for any length of time there is no danger of failure through fatigue.

The arrangement according to the invention may be incorporated in any device which requires to be switched on by authorised persons only.

The system hereinbefore described may be associated with a circuit which will give an alarm signal if the lock is tampered with by an unauthorised person.

Referring to the drawing this circuit is constituted as follows:

A radio-transmitter 13 is associated with an audio-supply unit 14 for radiating a warning through the aerial 15, the energy being supplied thereto from the main supply $r$ via a number of switches $f^{1\prime}$, $f^{2\prime}$, $f^{3\prime}$. The latter are under the control of the relays $e^1$, $e^2$, $e^3$, being in the contact making position so long as the valves oscillate and the relays are not energised, but as soon as the oscillations are quenched and the relays energised, they are opened and the transmitter is disconnected from the main supply. The latter happens when the combination plug is inserted into the combination socket, in which case the switches $f^1$, $f^2$, $f^3$ are closed to operate the lock.

A key switch 1 is connected in series with a number of trip switches 2, with a reset test switch 3, which is bridged by an impulse switch 4, and with a coil 5 energised by the standing low tension supply from the secondary 6 of the transformer $q$. The impulse switch 4 is provided in order to ensure that this circuit will be automatically connected up again in the case of temporary failure of the main supply.

The coil 5 is connected across a coil 7 when the reset test switch 3 is closed by hand or when the impulse switch 4 is operated, thus energising the coil 7, but only if the circuit of the said series connected switches is continuous, in which case the contacts 8 close, retaining the coil 7 and closing the contacts 9, thereby placing the low tension supply to one side of the coil 10. In this condition the coil 5 is energised, causing the contacts 11 to open and the contacts 12 to close and retain the coil 5 in this position.

The system is now primed ready for operation as long as the mains supply is maintained at the primary of the transformer $q$ and key switch 1 is closed.

If now any one or more of the trip switches 2 is or are opened, the coil 5 is de-energised, opening the contacts 12 which break its retaining supply, and the contacts 11 close, thereby connecting the coil $s$ to the low tension supply and closing the contacts $s^1$ to complete the circuit of the main supply $r$ to the oscillator unit and its power pack $i$, but since no combination plug is inserted in the circuit the oscillators are allowed to oscillate, and the anode relays not having sufficient energising current cannot operate the switches $f^1$, $f^2$, $f^3$, and $f^{1\prime}$, $f^{2\prime}$, $f^{3\prime}$, thus allowing the main supply $r$ to remain in circuit through the latter three switches with the radio transmitter 13 and the audio supply unit 14, connected to the transmitter, whereby a warning is radiated through the aerial 15.

If, on the other hand, the system is still primed and the circuit of the series connected trip switches is still complete, and any movement is mechanically applied to the lock bolt $v$ in order to either retract or move it forward, then the contacts 16 which are fitted to an insulated carrier 17 on the lock bolt $v$ make contact with contact $t^2$ or 19 respectively, thereby completing the low tension supply to the coil 10, when the contacts 20 retain the coil 10 in this position. The contacts 21 are also closed, completing the low tension supply to coil $s$, thus closing contacts $s^1$ to complete again the circuit of the main supply $r$ to the unit of oscillators and its power pack $i$, the rest of this operation being again as above described.

After the system has been operated in either of the above two cases, the reset test switch 3 is pressed to short its three contacts, which will prime the system again if the circuit of the series connected trip switches has been closed, this being indicated by a neon light 22 which is connected to the low tension supply via the contacts 9 and remains lit after release of the press button reset test switch 3; however, if the neon light does not remain lit, this is a sign that the circuit of the trip switches is open and should be re-established, otherwise the system cannot be reset.

The purpose of the coil 7 is to close its contacts 8 and 9 when energised by the low tension supply: the contacts 8 in order to maintain the low tension supply and the contacts 9, in order to provide the supply to the remote control coil *s* via the shorting link *d* of the combination plug *g* or contacts 11. In this way the system is prevented from being accidentally switched on, should the mains supply have been switched off from the transformer *q* to make any repairs, and should one or more trip switches have been left open; and the reset test switch 3 and/or the impulse switch 4 cannot reset the system to give a false alarm should the combination plug be out of circuit.

The electromagnetic lock A is preferably built into the doorway in such a manner as to prevent any wiring thereto having to be flexible, or pass across a hinge movement, which reduces the security factor.

The details for carrying the invention into effect may be modified without departing from its scope.

I claim:

1. An electronic combination switch to be connected to an electric power supply, comprising a master electromagnetic lock, a number of oscillators tuned to different frequencies and of the type in which the plate current increases when the oscillator is quenched, a corresponding number of tuned absorption circuits coupled to the said oscillators and each including a capacitor, the said capacitors being assembled to form a key in the form of a "combination plug" attachable to and detachable from the remainder of the said absorption circuits thereby enabling persons in possession of the said plug to have access to the operation of the master electromagnetic lock, a number of relays respectively operated by the said oscillators, a number of switches respectively operated by the said relays and arranged in series with one another and with the master electromagnetic lock, whereby without the combination plug inserted into the absorption circuits the oscillators will continue to operate without being quenched, and the relays will not respond to operate the series connected switches and master electromagnetic lock, whilst with the combination plug inserted quenching takes place and the currents flowing through the relays are increased and thus enable to close the switches and operate the master electromagnetic lock.

2. An electronic combination switch as claimed in claim 1, including a power pack for supplying current to the said oscillators and also to the master electromagnetic lock in series with the said switches and a low tension circuit between the power pack and the power supply and further including a screening metal case housing the oscillators and the power pack and fitted at a suitable point inside the area secured by the master electromagnetic lock.

3. An electronic combination switch as claimed in claim 1, comprising a "combination panel" having a "combination socket" consisting of terminals included in the absorption circuits for engagement with the "combination plug" and a metal case enclosing the "combination socket" and fitted outside the area secured by the master electromagnetic lock.

4. An electronic combination switch as claimed in claim 1, including: a power pack for supplying current to the said oscillators and also to the master electromagnetic lock in series with the said switches, a low tension supply circuit between the power supply and the power pack, a screening metal casing housing the oscillators and the power pack and fitted at a suitable point inside the area secured by the electromagnetic lock; a "combination panel" comprising a "combination socket" consisting of terminals included in the absorption circuits for engagement with the "combination plug" and a metal case enclosing the "combination socket" and fitted outside the area secured by the master electromagnetic lock; a low tension supply circuit between the power supply and the "combination socket," which latter low tension supply circuit includes terminals incorporated in the "combination socket"; a shorting link in the "combination plug" for engagement with the latter terminals; a switch inserted in the low tension supply circuit between the power supply and the power pack; and an electromagnet inserted in the low tension supply circuit connected to the "combination socket" for operating the latter switch, whereby the supply of energy to the power pack is made dependent upon the shorting link in the "combination plug" making contact with the corresponding terminals in the "combination socket."

5. An electronic combination switch as claimed in claim 1, including: a power pack for supplying current to the said oscillators and also to the master electromagnetic lock in series with the said switches; a low tension supply circuit between the power supply and the power pack, a switch in the latter circuit; a "combination panel" comprising a "combination socket" consisting of terminals included in the absorption circuits for engagement with the "combination plug" and a metal case enclosing the "combination socket" and fitted outside the area secured by the master electromagnetic lock; a low tension supply circuit between the power supply and the "combination socket," which latter low tension supply circuit includes terminals incorporated in the "combination socket"; a shorting link in the "combination plug" for engagement with the latter terminals; a radio-transmitter of an alarm signal to be given in the case of any attempt of tampering; a current supply circuit between the power pack and the radio-transmitter; a second series of switches under the respective control of the said relays and connected in parallel with one another in the supply circuit between the power pack and the radio-transmitter, these switches being arranged to remain closed as long as the relays are not energised and to open when they are energised; and further including another low tension circuit; a step down transformer between the latter circuit and the power supply circuit, the latter low tension circuit including in series across the secondary of the transformer a key switch 1, trip switches 2, a reset test switch 3 and a coil 5; and a circuit including an electromagnet for operating the switch in the low tension circuit between the power supply and the power pack, which latter circuit is capable of closing the latter switch if any of the trip switches 2 is opened, thereby allowing power to be supplied to the power pack, whereby, since in this case no "combination plug" is plugged into the "combination socket" the oscillators are allowed to oscillate so that the said parallel connected switches controlled by the relays remain in a position in which the power pack is connected to the radio-transmitter of the alarm signal.

6. An electronic combination switch as claimed in claim 5, and in which the master electromagnetic lock comprises a coil and a core consisting of a bolt having a ward, including contacts capable of being actuated by the said ward and forming part of the said circuit system, whereby in the case of attempted mechanical retraction or forward movement of the bolt, the latter contacts complete the circuit of the electromagnet operating the switch in the low tension circuit between the power supply and the power pack, supplying current to the oscillators, and in the absence of any plug-in of the combination plug the oscillators are allowed to oscillate so that the parallel connected switches controlled by the relays remain in a position in which the power pack is connected to the radio transmitter of the alarm signal.

7. An electronic combination switch as claimed in claim 5, and in which the master electromagnetic lock comprises a coil and a core consisting of a bolt having a ward, including contacts capable of being actuated by the said ward and forming part of the said circuit system, whereby in the case of attempted mechanical retraction or forward movement of the bolt, the latter contacts complete the circuit of the electromagnet operating the switch in the low tension circuit between the power supply and the power pack, supplying current to the oscillators, and in the absence of any plug-in of the combination plug the oscillators are allowed to oscillate so that the parallel connected switches controlled by the relays remain in a position in which the power pack is connected to the radio transmitter of the alarm signal, and further including a neon light indicator connected across the reset test switch 2 to indicate whether the trip switches have been tampered with.

8. An electronic combination switch as claimed in claim 5, including an impulse switch 4 connected in parallel with the reset test switch 2 across the secondary of the step-down transformer to ensure that the trip switches 2 will be automatically connected up again in the case of temporary failure of the power supply.

ALBERT CHURCHILL.

REFERENCES CITED

The following references are of record in the file of this patent:

UNITED STATES PATENTS

| Number | Name | Date |
|---|---|---|
| 2,298,840 | Pursell | Oct. 13, 1942 |
| 2,441,557 | Bowne | May 18, 1948 |